United States Patent [19]
Baker

[11] Patent Number: 5,601,295
[45] Date of Patent: Feb. 11, 1997

[54] TOOL HOLDER SYSTEM FOR INDUSTRIAL CUTTING TOOLS

[76] Inventor: Arthur A. Baker, P.O. Box 96, Pendleton, Ind. 46064

[21] Appl. No.: 580,813

[22] Filed: Dec. 29, 1995

[51] Int. Cl.⁶ .............................. B23B 31/20; B23B 31/34
[52] U.S. Cl. ............................ 279/46.5; 279/83; 279/133
[58] Field of Search ............................... 279/6, 46.5, 83, 279/133, 143, 145; 408/239 A

[56] References Cited

U.S. PATENT DOCUMENTS

| | | | |
|---|---|---|---|
| 965,893 | 8/1910 | Hanson . | |
| 1,157,817 | 10/1915 | Steudner | 279/6 |
| 1,744,521 | 1/1930 | Briese et al. . | |
| 2,869,879 | 1/1959 | Burton | 279/6 |
| 3,507,508 | 4/1970 | Andrews | 279/83 |
| 4,896,892 | 1/1990 | Andrews | 279/1 A |
| 4,958,966 | 9/1990 | Andrews | 408/239 A |
| 4,989,887 | 2/1991 | Jordan | 279/133 |
| 5,096,212 | 3/1992 | Walsh | 279/41 R |
| 5,193,825 | 3/1993 | Kanaan et al. | 279/133 |
| 5,286,042 | 2/1994 | Laube | 279/133 |

*Primary Examiner*—Steven C. Bishop
*Attorney, Agent, or Firm*—Brinks Hofer Gilson & Lione

[57] ABSTRACT

A tool holder system for mounting a cutting tool to a drive unit of a cutting tool apparatus. The tool holder system has a collet having a longitudinal bore for receiving a tool and a collet holder having a longitudinal bore for receiving the collet and the tool received in the collet, and the collet holder is coupled to the drive unit of the cutting tool apparatus. The collet has a narrow slit extending through a wall thereof from an outer surface of the collet to its longitudinal bore and a force-receiving portion on the outer surface thereof which is spaced from the slit by a distance of less than 90 degrees. The collet holder includes at least one aperture aligned with the force-receiving portion for receiving at least one pressing member for pressing against the force-receiving portion to close the slit in the collet to clamp the collet around the tool substantially around its entire circumference so as to reliably and effectively retain the tool within the collet. The invention also includes structure for adjusting the collet holder both axially and radially with respect to the axis of rotation of the drive unit of the cutting tool apparatus to ensure that the tool is properly and accurately aligned at all times.

15 Claims, 4 Drawing Sheets

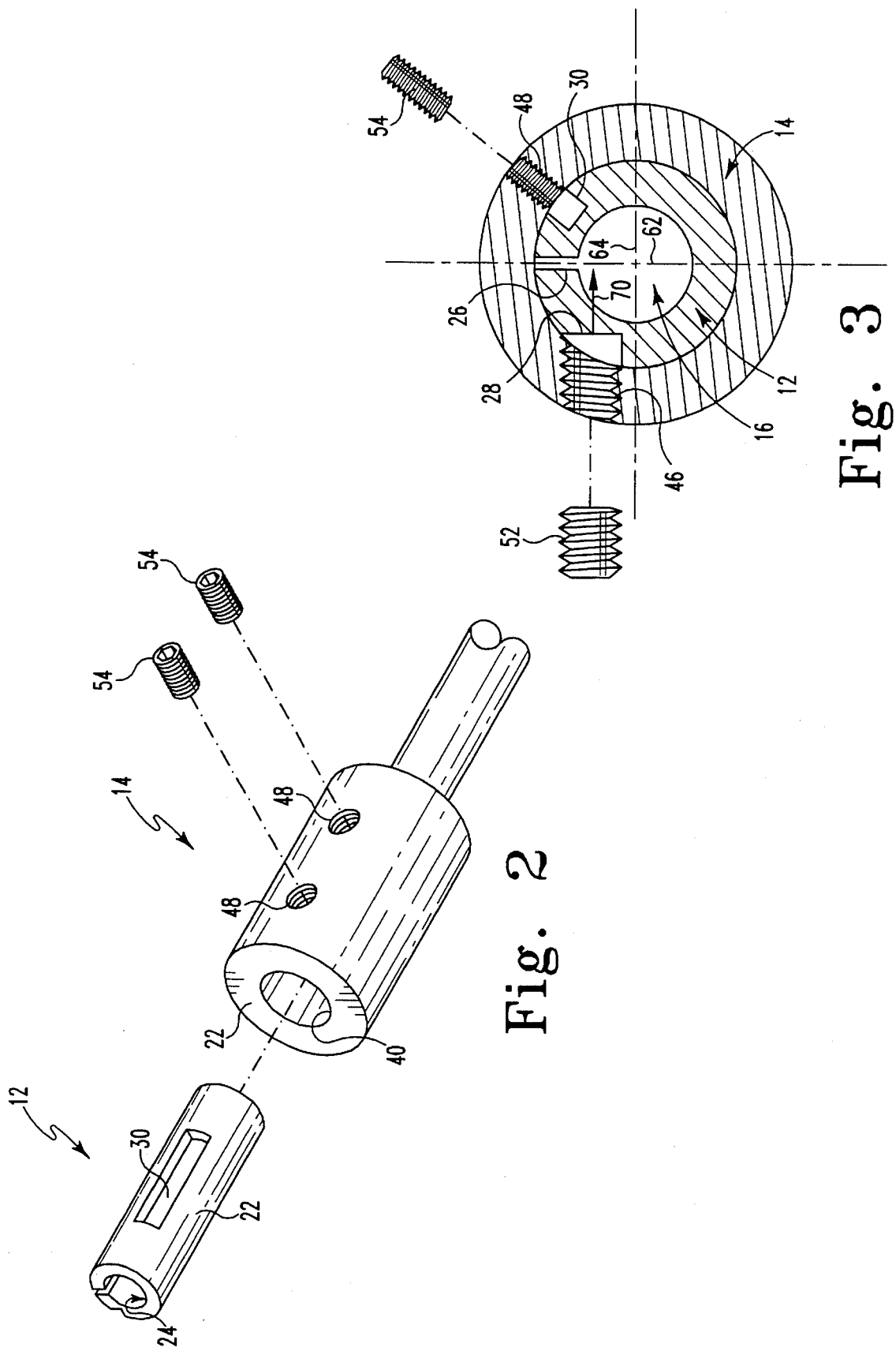

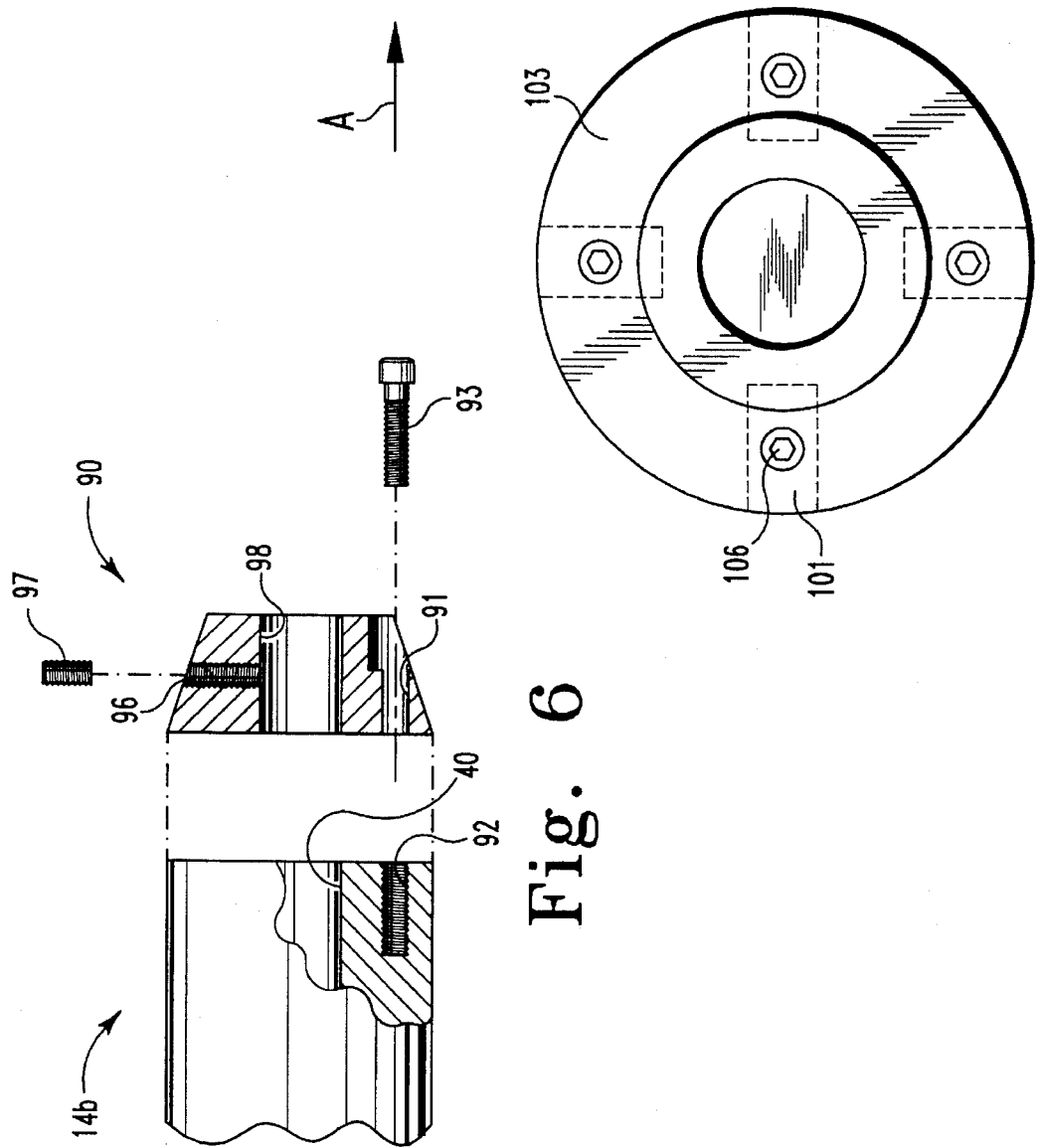

TOOL HOLDER SYSTEM FOR INDUSTRIAL CUTTING TOOLS

BACKGROUND OF THE INVENTION

1. Field of the Invention

The present invention relates to a tool holder system for industrial cutting tools such as drills, boring tools, probes, and the like; and to an improved collet and collet holder for use in such system.

2. Description of the Prior Art

An industrial cutting tool apparatus conventionally includes a power drive unit, such as an electric, hydraulic or pneumatic motor; a suitable cutting tool, such as a drill, boring tool, probe or the like; and a tool holder for connecting the cutting tool to the power drive unit. The tool holder typically includes a socket or sleeve member which is mounted directly to the power drive unit and which is adapted to support the cutting tool in order to connect the tool to the power drive unit.

Usually, the socket is of a fixed size whereas the size of the tool may vary. Accordingly, it has become customary in the industry to provide intermediate bushings or collets to mount the tool to the socket. In particular, collets are provided which have a fixed external dimension sized to properly fit within the socket, but which have internal dimensions which vary so as to receive tools of different size.

In tool holder systems utilizing an intermediate collet, in order to ensure that the cutting tool is properly driven and maintained accurately aligned with the rotational axis of the power drive unit at all times; it is necessary to prevent the tool from slipping or otherwise moving within the collet; and, in addition, to prevent the collet from slipping or otherwise moving within the socket. This has been difficult to accomplish in a fully satisfactory manner, particularly with respect to securing the tool in the collet; and various collet structures have been developed in an effort to reliably support and hold the tool.

For example, in one common design, the collet includes a tapered axial bore for receiving the shank of the tool, and is provided with a plurality of longitudinal slits configured on the tapered inside diameter of the collet. A nut is secured onto the collet in such a manner as to cause the slits to be squeezed closed so as to compress the collet around the tool shank to grab and hold the tool.

In collets incorporating such design, however, the collet wears on the taper after a period of time resulting in a reduced holding force that can cause the tool to slip. Also, such collets tend to be inconsistently manufactured with respect to the accuracy of the taper and the like which can cause the tool to bottom out against the collet also resulting in tool slippage. Further, as the collet is compressed around the tool, the tool is often pushed off center or turned at an angle resulting in misalignment of the tool.

In another known design, a tool holder is ground on center to form a bore of a specific uniform diameter to receive the tool shank with minimal clearance. Set screws, for example two set screws, are then screwed into the tool holder against flats formed on the tool shank to lock the tool to the tool holder.

In this design, the locking screws can also push the tool off center as they are screwed into the tool holder resulting in an inaccurate alignment.

In general, current tool holder systems are not fully satisfactory in maintaining a cutting tool properly aligned with the axis of rotation of the power drive unit of an industrial cutting tool apparatus and of reliably holding the tool against slippage during use of the apparatus.

SUMMARY OF THE INVENTION

The present invention provides a tool holder system for an industrial cutting tool apparatus which is effective in reliably supporting a cutting tool in accurate alignment with the axis of rotation of a power drive unit of the apparatus and in which slippage or rotation of the tool relative to a supporting collet is effectively prevented or deterred during use of the apparatus.

A tool holder system according to the present invention includes a generally tubular-shaped collet having a longitudinal bore for receiving a tool therein, and a collet holder having a longitudinal bore for receiving the collet for coupling the tool to a drive unit of a cutting tool apparatus. The collet, according to the present invention, includes a longitudinal slit extending through a wall thereof from an outer surface to the longitudinal bore, and a force-receiving portion formed on the outer surface which is spaced from the slit by a distance of less than 90 degrees around the circumference of the collet. The collet holder includes at least one aperture that is aligned with the force-receiving portion when the collet is received in the collet holder, and at least one pressing member is inserted through the at least one aperture to press against the force-receiving surface of the collet to close the slit to clamp the collet around the tool.

With the tool holder system of the present invention, when the collet is clamped around the tool, the collet engages the tool substantially completely around the tool to provide approximately 340 degrees to 360 degrees of contact between the collet and the tool; and thus grips the tool more reliably with a reduced risk of slippage of the tool relative to the collet. Furthermore, the collet engages the tool along substantially the entire length of the collet as distinguished from many prior collet designs so as to even more effectively hold the tool.

According to a presently preferred embodiment, the force-receiving portion comprises a flat surface portion extending longitudinally of the collet and parallel to the slit, and the at least one pressing member comprises a pair of spaced locking screws which are screwed through a pair of apertures in the collet holder to press against the flat surface portion to close the slit. Preferably also, the collet further includes an elongated slot therein which is adapted to receive two anchoring screws which extend through further apertures in the collet holder and into the collet slot to lock the collet against rotation relative to the collet holder.

The surface of the longitudinal bore of the collet may also be roughened, for example, by applying an abrasive coating thereto, to even more effectively retain the tool against slippage.

According to a further embodiment of the invention, the tool holder system may include a cap member for the collet holder to help support the tool and for further retaining the collet against rotation with respect to the collet holder.

According to yet a further embodiment of the present invention, the tool holder system may also include an intermediate sleeve for mounting the tool to the collet. More particularly, the tool is first mounted in the intermediate sleeve in a longitudinal bore thereof which is ground to be slightly off-axis with respect to the outside diameter of the sleeve in a first radial direction by, for example, 0.003–0.005 of an inch. The intermediate sleeve having the tool mounted therein is then inserted into a collet and the collet is, in turn, inserted into a collet holder as indicated above. The bore of the collet holder is also formed to be off-axis by 0.003–0.005 of an inch but in a radial direction transverse to the first radial direction.

With this construction, the tool can be adjusted for off-axis positions relative to the rotational axis of the drive unit of the cutting tool apparatus easily and quickly by simply rotating the elements slightly with respect to one another.

In still a further embodiment of the invention, the collet holder may include structure to permit axial adjustment of the cutting tool with respect to the rotational axis (centerline) of the power drive unit of the cutting tool apparatus. In accordance with this embodiment, the collet holder includes an outwardly extending annular flange adjacent its base, and a plurality (at least three) of spaced slots are formed in the flange to extend laterally thereinto. A plurality of threaded apertures extend through the upper edge of the flange and into each of the slots. Screws are adapted to be threaded through the apertures and extended through the slots to engage and push against the opposite face of the slots so as to tend to separate the faces of the slots so as to cause the collet holder to tilt slightly. By selectively threading one or more screws through the slots, precise axial adjustment of the collet holder with respect to the axis of rotation of the power drive unit can be achieved.

Yet further advantages and specific details of the invention will become more readily apparent hereinafter in conjunction with the following detailed description of presently preferred embodiments.

BRIEF DESCRIPTION OF THE DRAWINGS

FIG. 2 is a reverse view of the system of FIG. 1;

FIG. 3 is a schematic cross-sectional view illustrating the system of FIG. 1 in assembled form;

FIG. 6 is a partial cross-sectional view illustrating a tool holder system according to a third embodiment of the invention;

FIG. 7 is a partial cross-sectional view illustrating a tool holder system according to a fourth embodiment of the invention; and FIG. 8 is a plan view of the tool holder system of FIG. 7 looking in the direction of the arrow A in FIG. 7.

DETAILED DESCRIPTION OF THE PREFERRED EMBODIMENTS

Figure 1:
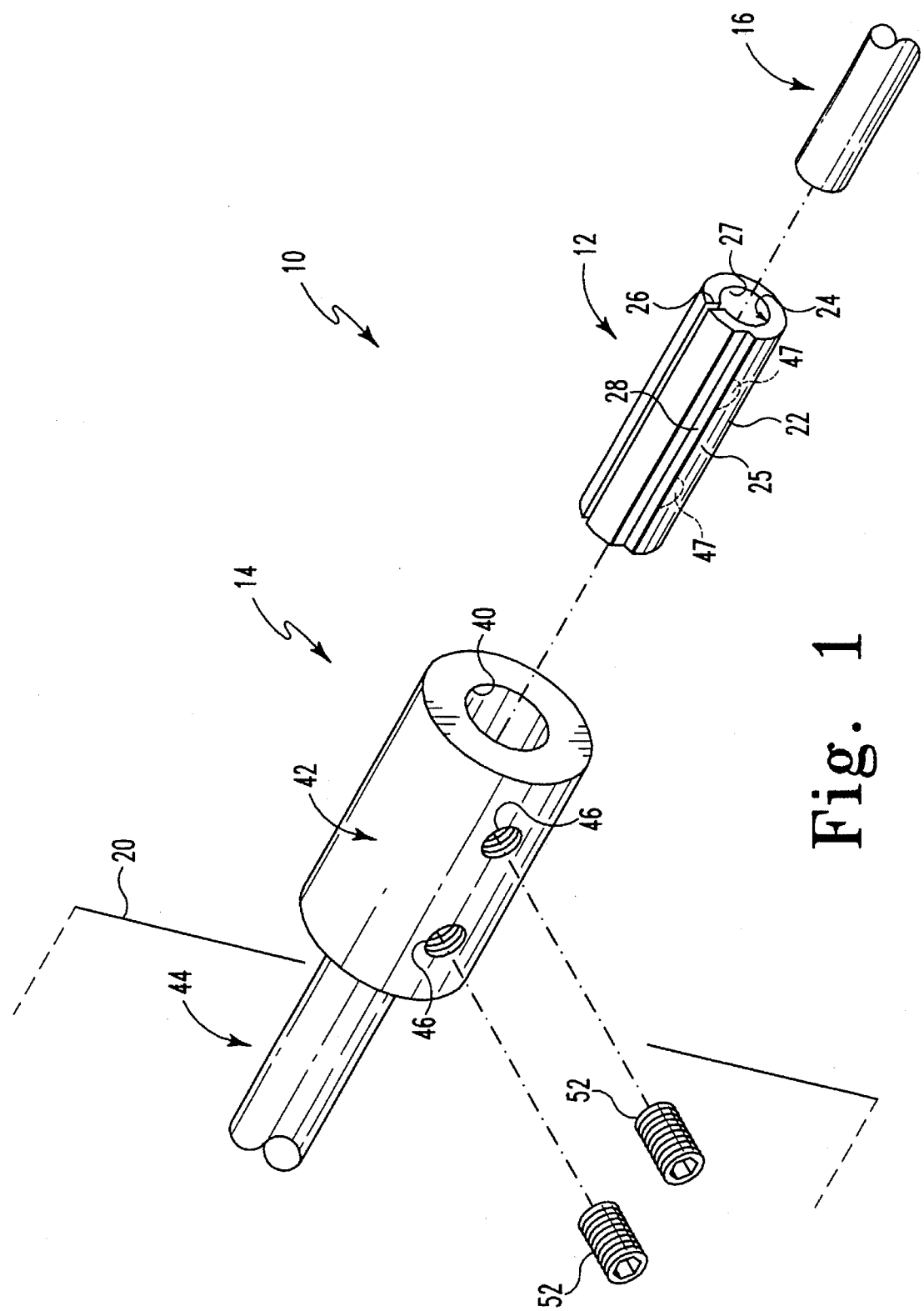
FIG. 1 is an exploded perspective view of a tool holder system according to a presently preferred embodiment of the invention.

FIGS. 1 and 2 illustrate a tool holder system according to a presently preferred embodiment of the invention. The system is generally designated by reference no. 10 and comprises a collet 12 and a socket or collet holder 14.

The collet holder 14 comprises a member that is adapted to be mounted directly to the power drive unit of an industrial cutting tool apparatus which is schematically illustrated by reference no. 20 in FIG. 1, and is further adapted to support, within an axial, longitudinally extending bore 40 thereof, the shank or end of a cutting tool in order to connect the cutting tool to the power drive unit.

As is known to those skilled in the art, however, the diameter of bore 40 of collet holder 14 is usually of a fixed size; whereas the outside diameter of cutting tools usable in the apparatus may vary. Accordingly, it has become customary in the art to connect the tool to the collet holder by means of an intermediate collet. Specifically, collets are provided which have a fixed outside diameter sized to properly fit within the bore 40 of the collet holder, but which, in turn, have longitudinal bores which differ in size so as to properly receive tools of differing size.

Thus, as shown in FIG. 1, the shank of an industrial cutting tool 16 such as a drill, boring tool, probe or the like is adapted to be received within an axial, longitudinally extending bore 24 of the collet 12 (which is properly sized and configured to receive the selected tool 16); and the collet 12, with the cutting tool supported therein, is, in turn, adapted to be received within the bore 40 of the collet holder 14 in order to connect the tool 16 to the power drive unit of the apparatus 20.

As shown in FIGS. 1 and 2, collet 12 comprises a generally tubular-shaped member 22, of, for example, stainless steel, having an axial bore 24 extending therethrough which is sized to receive the shank of tool 16 with only a slight clearance so that the tool shank will fit rather snugly therein. As best shown in FIG. 1, a narrow slit 26 is cut through the wall of the tubular-shaped collet along its entire length so as to extend from the outer surface 25 to the inner surface 27 thereof which defines the bore 24. In addition, the outer surface 25 of the collet is formed to include a narrow, elongated flat surface portion 28 which extends the length of the collet and which functions as a force-receiving portion for use in clamping the collet around the tool shank as will be explained hereinafter.

As best shown in FIG. 2, on the side of the collet opposite that of the flat surface portion 28, an elongated slot 30 is provided which extends partially into the collet from the outer surface 25.

The collet holder 14 includes a collet receiving portion 42 having an axial bore 40 therein for receiving the collet 12 as indicated above, and a coupling portion 44 for coupling the collet holder to the power drive unit of the cutting tool apparatus 20. Bore 40 is sized to receive collet 12 with only a slight clearance so that the collet will be received snugly therein.

As shown in FIG. 1, a first pair of threaded holes or apertures 46 is formed in one side of collet receiving portion 42 so as to extend into bore 40; and as shown in FIG. 2, a second pair of threaded holes or apertures 48 is formed in the side of portion 42 opposite holes 46. The first pair of threaded holes 46 is positioned to be aligned with flat surface portion 28 on collet 12 when the collet is received in collet holder 14, and the second pair of threaded holes 48 is positioned to be aligned with elongated slot 30 in the collet when the collet is received in the collet holder.

FIG. 3 is a cross-sectional view illustrating collet 12 (having the shank of tool 16 supported therein) received within the bore 40 of collet holder 14. As shown in FIG. 3, the flat surface portion 28 formed on the outer surface 25 of collet 12 is aligned with the first pair of threaded openings 46 in the collet holder; and the narrow slot 30 in the collet is aligned with the second pair of threaded openings 48 in the collet holder. A pair of pressing members, which preferably comprise a pair of clamping screws 52, such as allen-head screws, are then threaded into openings 46 until they come into contact with flat surface portion 28 on the collet. The screws 52 are then further screwed into openings 46 so as to push against the flat surface portion 28 causing the collet to be compressed inwardly to close the narrow slit 26 therein. When the slit 26 is substantially fully closed, the collet will be firmly clamped around the tool 16 to reliably lock the tool against rotation or slippage relative to the collet.

After the collet has been clamped around the tool as indicated above, a pair of anchor screws 54, which may also be allen-head screws, are screwed into the second pair of openings 48 of the collet holder. The length of screws 54 are such that they will extend into narrow slot 30 of the collet and this way lock the collet to the collet holder so as to help prevent the collet from rotating relative to the collet holder.

Thus, with the present invention, the cutting tool is locked in place within the collet, and the collet is locked in place within the collet holder.

FIG. 3 also illustrates an important aspect of the present invention. In particular, FIG. 3 illustrates a first centerline 62 of the collet 12 which is defined by the narrow slit 26 in the collet 12, and a second centerline 64 of the collet perpendicular to centerline 62. Flat surface portion 28 is provided at a position which is slightly offset from centerline 64 in the direction of slit 26. In other words, surface portion 28 is positioned so as to be spaced from slit 26 by a distance of less than 90 degrees around the circumference of the collet, i.e., to be in the same 90-degree quadrant of the collet as slit 26. In addition, surface 28 is formed so as to be substantially parallel to slit 26. Accordingly, when the first pair of screws 52 push inwardly against surface 28, they will push against the collet with a force which extends substantially perpendicular to slit 26, in the direction of arrow 70, so as to substantially completely close slit 26 while maintaining the two faces defining the slit 26 substantially parallel to one another. As a result, the collet 12 will clamp around substantially the entire circumference of the tool 16 in a highly uniform manner with high torque directed on surface 28.

In particular, with the present invention, when the collet is compressed around the tool, it will contact the tool substantially completely around the tool to provide approximately 340–360 degrees of contact between the collet and the tool shank so that the tool will be held reliably and firmly in the collet. Furthermore, the collet will contact the tool along substantially the entire length of the collet for even greater clamping effectiveness.

The diameter of the locking screws 52 are preferably approximately equal to the height of the flat surface portion 28 on the collet. In some embodiments, however, depending on the thickness of the collet, in order to avoid cutting too deeply into the collet when forming surface 28, it may be desired to form the flat surface portion 28 to be slightly narrower that the diameter of the locking screws and to provide flat, semi-circular extension portions on the collet to receive the screws. These extension portions are illustrated in dotted line in FIG. 1 and are designated by reference no. 47.

In a presently preferred embodiment, the flat surface portion 28 and the narrow slot 30 are formed in the collet to be approximately 116 degrees apart.

The tool holder system of the present invention can be utilized with substantially any type of industrial cutting tool apparatus. The collet holder can also be of numerous types, for example, it can include either a smooth or threaded coupling portion 44 depending on the particular application or mounting face.

In order to further reduce the possibility of the tool slipping relative to the collet, the inner surface 27 of the collet may comprise a roughened surface for enhanced gripping ability with controlled thickness in conjunction with machining parameters. Preferably, this is achieved by applying an abrasive coating to the surface 27. Such coatings are known in the art and can be conveniently utilized in the tool holder system of the present invention.

Figure 4:
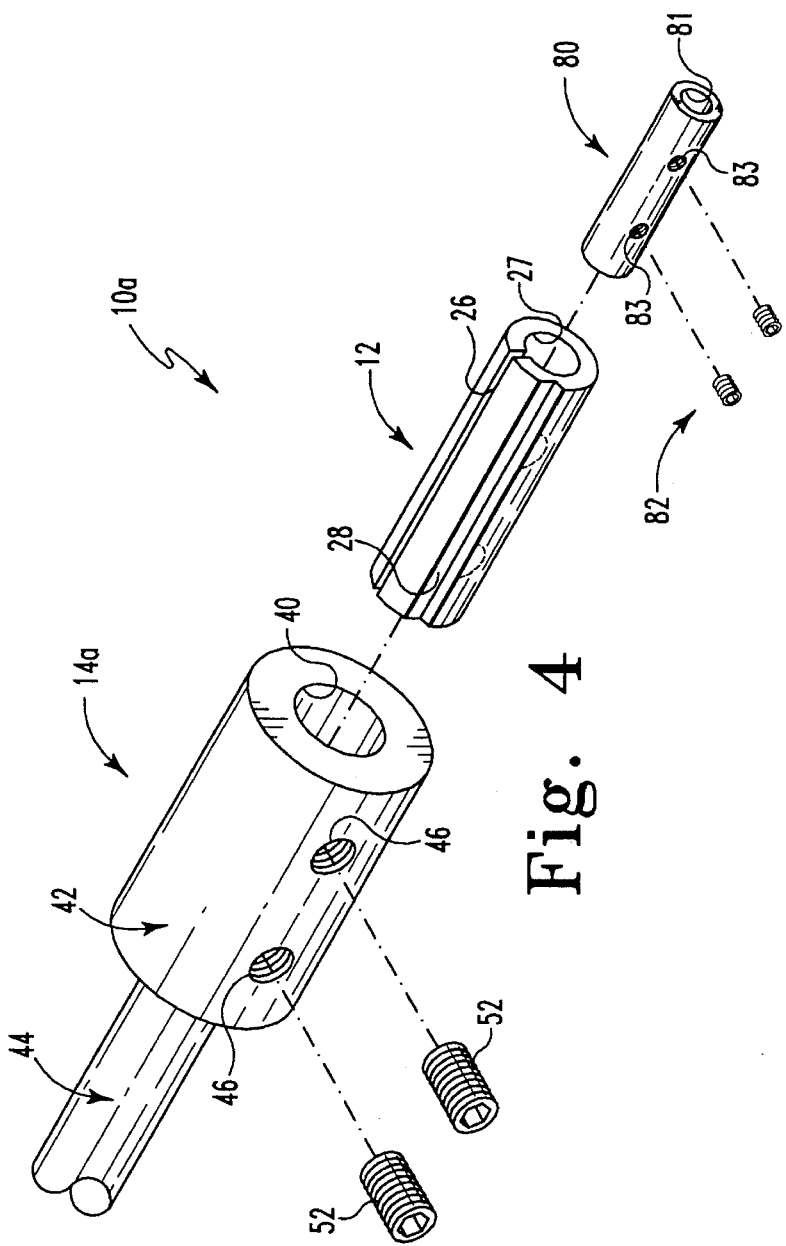
FIG. 4 schematically illustrates a tool holder system according to a second embodiment of the present invention.

FIG. 4 illustrates an alternative embodiment of the invention. Specifically, in FIG. 4, the tool holder system 10a includes a tubular-shaped intermediate sleeve 80 in addition to the collet 12 and the collet holder (designated in this embodiment by reference no. 14a). In this embodiment, the tool shank is initially inserted into a longitudinal bore 81 in intermediate sleeve 80 and is secured to the sleeve by a pair of locking screws 82 which are screwed into apertures 83 in the sleeve. Sleeve 80 with the tool supported therein is then inserted into the collet 12 as a unit.

Figure 5A:
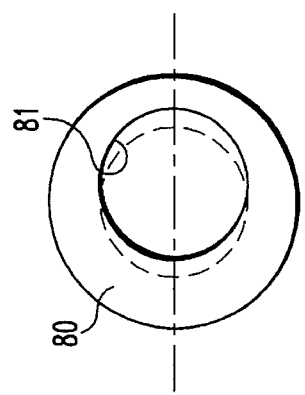
FIGS. 5A and 5B are schematic cross-sectional views to assist in explaining the embodiment of FIG. 4.
Figure 5B:
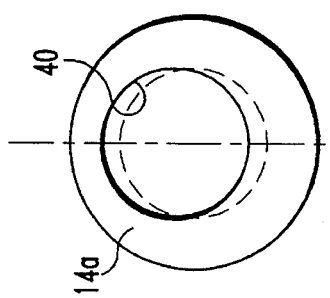

Sleeve 80 is characterized in that longitudinal bore 81 thereof is formed and can be slightly off-axis with respect to the outside diameter of the sleeve, for example by 0.003–0.005-inch. When, accordingly, the sleeve is inserted into the collet, the tool will be supported at a position that is off-axis by 0.003–0.005-inch in one direction (the horizontal direction) as illustrated in FIG. 5A (the amount by which the bore 81 is off-axis is exaggerated in FIG. 5A for ease in illustration). The collet, with the intermediate sleeve-supported tool, is then inserted into the collet holder 14a as described above. The longitudinal bore 40 in the collet holder 14a is also formed to be off-axis by 0.003–0.005-inch, but in the vertical direction as shown in FIG. 5B (the off-axis amount is also exaggerated in this Fig.).

Therefore, when the tool holder system 10a is assembled, the tool will be off-axis by 0.003–0.005 inch in both the horizontal and the vertical directions; i.e., along both transverse axes with respect to the power drive unit of the cutting tool apparatus.

This design provides the operator with the capability of quickly and simply adjusting the position of the cutting tool with respect to the power drive unit so as to find the actual center line of the axis of rotation of the power drive unit. This can be simply done by rotating the intermediate sleeve relative to the collet and/or by rotating the collet holder relative to the cutting tool apparatus while monitoring the position of the tool by a well-known position detection structure.

Thus, with the embodiment of FIGS. 4 and 5, radial adjustment for centering of the machine tool can be accomplished readily and accurately to find the exact centerline of the part being machined.

It should also be emphasized that although longitudinal bore 81 of sleeve 80 is shown and described as being of cylindrical shape, the bore can have any configuration appropriate to the configuration of the tool to be inserted therein; and it is not intended to limit the invention to any particular configuration. For example, the bore 81 could be of square shape, tapered or stepped as may be required by the shape of a particular tool to be inserted therein.

Similarly to the above, and particularly in embodiments which do not utilize the intermediate sleeve 80, the bore 27 of collet 12 may also be of any appropriate configuration to receive variously configured tools, and is not limited to being of cylindrical shape.

FIG. 6 illustrates yet a further embodiment of the invention. In FIG. 6, a removable cap is provided for the collet holder 14b. The removable cap, designated by reference no.

90, is of generally truncated frusto-conical shape and has a plurality of screw holes 91 (for example, four spaced holes) around the circumference of the cap; and the collet holder is provided with a like number of threaded openings 92 extending into the holder from its upper edge so that the cap can be mounted to the collet holder by a plurality of screws 93 (only one is shown in FIG. 6 for ease in illustration).

The cap 90 also includes a threaded opening 96 which extends inwardly from the side surface thereof to central bore 98 thereof. A screw 97 is adapted to be threaded into the opening 96 to engage the tool positioned within the bore 98 (which is aligned with bore 40 of the collet holder 14*b* so as to assist in locking the tool within the system.

The cap 90 thus provides an additional locking mechanism to even more reliably retain the cutting tool and the collet which supports the tool firmly within the collet holder and to prevent the tool from rotating relative to the holder.

FIGS. 7 and 8 illustrate still another embodiment of the present invention. In particular, in the embodiment described with reference to FIGS. 4 and 5, the operator is provided with the capability of radially adjusting the position of the cutting tool with respect to the power drive unit so as to find the actual centerline of the power drive unit. In the embodiment of FIGS. 7 and 8, structure is provided to additionally permit the operator to axially adjust the orientation between the tool and the centerline of the power drive unit.

FIG. 7 illustrates the base portion of a collet holder 14*c*. The collet holder 14*c* includes a recess 105 adapted to receive an extended portion of the machine tool apparatus (not shown in the Fig.) in order to mount the collet holder to the apparatus. This form of mounting design is illustrated in the Fig. simply to show that the present invention can be utilized with numerous collet holder designs.

Collet holder 14*c* is specifically designed to have an outwardly extending annular flange 103 adjacent the base thereof and the flange is provided with a plurality of slots 101 (at least three slots) extending laterally thereinto. As shown in FIG. 8, four slots 101 are preferably provided at diametrically opposed locations around the flange 103. The flange also includes a plurality (i.e., four) of threaded apertures 104 extending through the upper edge 103*a* of the flange and into each of the slots 101. Each of the apertures is adapted to receive a screw 106 as shown in the Figs.

A screw 106 is adapted to be threaded into and through an aperture 104 and through its associated slot 101 until it engages the bottom face 107 of the slot. By further threading the screw into aperture 104, the screw will press against face 107 and cause the upper edge 103*a* of the flange 103 to separate or move away from the lower edge 103*b* of the flange of the collet holder (i.e., the slot will be spread apart). As this happens, the collet holder will tend to tilt somewhat, for example, by an amount of 0.0008-inch to 0.001-inch so as to permit axial adjustment of the orientation of the collet holder with respect to the axis of rotation (centerline) of the power drive unit. By threading one or more of the screws 106 into and through their respective slots, precise axial alignment can be obtained.

It should be recognized that the embodiment of FIGS. 7 and 8 can be used alone or in conjunction with the embodiment of FIGS. 4 and 5 to provide the capability of complete adjustment of the collet holder with respect to the centerline of the power drive unit of the cutting tool apparatus.

While what has been described comprises presently preferred embodiments, it should be understood that the invention could take numerous other forms. Accordingly, it should be recognized that the invention should be limited only insofar as is required by the scope of the following claims.

I claim:

1. A tool holder system for mounting a cutting tool to a drive unit of a cutting tool apparatus, the tool holder system comprising:

a collet having a longitudinal bore therein for receiving a tool; and a collet holder having a longitudinal bore therein for receiving said collet and said tool received in said collet, said collet holder being adapted to be coupled to said drive unit of said cutting tool apparatus, the collet including:

a narrow slit extending through a wall thereof from an outer surface of said collet to said longitudinal bore; and a force-receiving portion provided on said outer surface, said force-receiving portion being spaced from said slit by a distance of less than 90 degrees; and the collet holder including:

at least one aperture aligned with said force-receiving portion when said collet is received within said collet holder for receiving at least one pressing member for pressing against said force-receiving portion of said collet for closing said slit in said collet to clamp said collet around said tool.

2. The tool holder system of claim 1 wherein said force-receiving portion comprises a flat surface portion extending substantially the length of said collet.

3. The tool holder system of claim 2 wherein said flat surface portion is substantially parallel to said slit.

4. The tool holder system of claim 2 wherein said at least one aperture comprises a plurality of threaded apertures, and said at least one pressing member comprises a plurality of screws for being threaded into said apertures for pressing against said flat surface portion at a plurality of locations along the length of said collet.

5. The tool holder system of claim 1 wherein said collet further includes an elongated slot therein, and said collet holder further includes a plurality of second openings extending therethrough in alignment with said slot for receiving a plurality of anchor screws which extend into said slot for locking said collet to said collet holder.

6. The tool holder system of claim 1 wherein a surface of said longitudinal bore of said collet includes means for defining a roughened surface for reducing slippage between said tool and said collet.

7. The tool holder system of claim 6 wherein said means for defining a roughened surface comprises an abrasive coating applied to said surface of said longitudinal bore of said collet.

8. The tool holder system of claim 1 and further including an intermediate sleeve for supporting said tool in said longitudinal bore of said collet, said intermediate sleeve having a bore for receiving said tool which is slightly off-axis relative to an outer surface of said sleeve; and wherein said longitudinal bore of said collet holder is also off-axis with respect to an outer surface of said collet holder for permitting adjustment of said tool relative to an axis of rotation of said drive unit.

9. The tool holder system of claim 8 wherein said bore of said intermediate sleeve and said longitudinal bore of said collet holder are off-axis in transverse directions with respect to one another.

10. The tool holder system of claim 1 and further including a removable cap member for said collet holder, said cap member surrounding said tool and said collet for further supporting said tool in alignment with said drive unit.

11. The tool holder system of claim 1 and further including means for axially adjusting the orientation of said collet holder with respect to said axis of rotation of said drive unit.

12. The tool holder system of claim 11 wherein said axial adjusting means includes:

an outwardly extending annular flange adjacent a base of said collet holder;

a plurality of spaced slots extending laterally into said flange;

a plurality of threaded apertures extending longitudinally into said flange in alignment with said plurality of slots; and a plurality of screws receivable in said threaded apertures and adapted to extend into and across said slots to press against an opposed face of said slots to slightly open said slots to axially adjust the orientation of said collet holder.

13. A tool holder system for mounting a cutting tool to a drive unit of a cutting tool apparatus, the tool holder system comprising:

a collet having a longitudinal bore therein for receiving a tool;

a collet holder having a longitudinal bore therein for receiving said collet and said tool received in said collet, said collet holder being adapted to be coupled to said drive unit of said cutting tool apparatus;

first means for radially adjusting the position of said collet holder with respect to an axis of rotation of said drive unit; and second means for axially adjusting the orientation of said collet holder with respect to said axis of rotation of said drive unit.

14. The tool holder system of claim 13 wherein said radially adjusting means comprises:

an intermediate sleeve for supporting said tool in said longitudinal bore of said collet, said intermediate sleeve having a bore for receiving said tool which is slightly off-axis relative to an outer surface of said sleeve; and wherein said longitudinal bore of said collet holder is also off-axis with respect to an outer surface of said collet holder for permitting adjustment of said tool relative to an axis of rotation of said drive unit.

15. The tool holder system of claim 13 wherein said axially adjusting means comprises:

an outwardly extending annular flange adjacent a base of said collet holder;

a plurality of spaced slots extending laterally into said flange;

a plurality of threaded apertures extending longitudinally into said flange in alignment with said plurality of slots; and a plurality of screws receivable in said threaded apertures and adapted to extend into and across said slots to press against an opposed face of said slots to slightly open said slots to axially adjust the orientation of said collet holder with respect to said axis of rotation of said drive unit.

* * * * *